(12) United States Patent
Chang et al.

(10) Patent No.: US 11,755,423 B2
(45) Date of Patent: Sep. 12, 2023

(54) MOBILE DEVICE FOR PROTECTING DATA STORED IN DATA BACKUP DEVICE AND DATA PROTECTION METHOD THEREOF

(71) Applicant: VINPOWER INC., Alhambra, CA (US)

(72) Inventors: Calvinson Chang, Alhambra, CA (US); Stanley Chu, Alhambra, CA (US); Chihhan Chou, Alhambra, CA (US)

(73) Assignee: Vinpower Inc., Alhambra, CA (US)

( * ) Notice: Subject to any disclaimer, the term of this patent is extended or adjusted under 35 U.S.C. 154(b) by 0 days.

(21) Appl. No.: 17/650,564

(22) Filed: Feb. 10, 2022

(65) Prior Publication Data
US 2023/0251936 A1 Aug. 10, 2023

(51) Int. Cl.
*G06F 11/14* (2006.01)
*H04L 67/02* (2022.01)

(52) U.S. Cl.
CPC ...... *G06F 11/1461* (2013.01); *G06F 11/1451* (2013.01); *G06F 11/1469* (2013.01); *H04L 67/02* (2013.01)

(58) Field of Classification Search
CPC ............ G06F 11/1461; G06F 11/1451; G06F 11/1469; H04L 67/02
USPC ........................................................ 714/6.3
See application file for complete search history.

(56) References Cited

U.S. PATENT DOCUMENTS

2015/0312233 A1* 10/2015 Graham, III ........ H04L 63/0435
713/171

FOREIGN PATENT DOCUMENTS

| CN | 102647702 A | 8/2012 |
| TW | M443232 U | 12/2012 |
| TW | 201804354 A | 2/2018 |

OTHER PUBLICATIONS

Google support page for android with answer 9064445 from date Jan. 20, 2022, retrieved from https://support.google.com/android/answer/9064445?hl=en (Year: 2022).*

* cited by examiner

*Primary Examiner* — Yair Leibovich
(74) *Attorney, Agent, or Firm* — Rosenberg, Klein & Lee

(57) ABSTRACT

A data protection method for protecting backup data stored in a data backup device is executed by a mobile device. When the mobile device is included in a trust circle of the data backup device, the mobile device can receive a certified signal, can execute a file manager of a backup APP for loading the backup data, and can generate a first invitation code. Otherwise, the mobile device cannot access the backup data, and displays a code input menu for inputting a second invitation code. The data backup device can certify the first invitation code and the second invitation code for determining whether the mobile device can be added into the trust circle of the data backup device. Therefore, the mobile device included in the trust circle can access the backup data, and the privacy of the backup data can be secured.

10 Claims, 11 Drawing Sheets

MOBILE DEVICE FOR PROTECTING DATA STORED IN DATA BACKUP DEVICE AND DATA PROTECTION METHOD THEREOF

BACKGROUND OF THE INVENTION

1. Field of the Invention

The present invention relates to a mobile device and a data protection method, especially a mobile device for protecting data stored in a data backup device, and a data protection method thereof.

2. Description of the Related Art

Mobile phones or tablets, collectively "Mobile Devices", have become an indispensable part of modern life. Statistically, the amount of data stored in a mobile device is increasing day by day. Therefore, backing up data stored on a mobile device has become a routine chore that a mobile device user must face. Nevertheless, charging a mobile device battery is also an essential daily routine to normally operate the mobile device. Therefore, a shortened charging time and a lower charging cost are both constantly demanded by mobile device users.

Hence, there are urgent needs for intelligent charging methods well adopted to reduce time and costs, and there are also urgent needs for seamlessly incorporating both the action of charging and the action of data backup, so that common users of mobile devices can effortlessly utilize both functionalities in one act.

Moreover, backup data stored in a backup device usually are private. Therefore, security of the backup data is also important for the users of the mobile devices.

SUMMARY OF THE INVENTION

In view of the above-mentioned needs, the main purpose of the present invention is to provide a mobile device for protecting data stored in a data backup device and a data protection method thereof, and the data backup device can automatically back up data while intelligently charging the mobile device. The mobile device and the data protection method of the present invention are as follows.

The mobile device for protecting data stored in a data backup device includes a communication interface, a processing unit, an input interface, and a display interface.

The communication interface is adapted to connect to the data backup device for receiving electric power from the data backup device and communicating with the data backup device.

The processing unit is electrically connected to the communication interface, the input interface, and the display interface, and determines whether a backup memory unit of the data backup device is locked.

When the backup memory unit is locked, the processing unit unlocks the backup memory unit, transmits a user ID data of the mobile device to the data backup device, and determines whether a certified signal is received from the data backup device through the communication interface.

When the certified signal is received, the processing unit executes a file manager for loading data stored in the backup memory unit, and determines whether the input interface generates a trust circle adding signal.

When the input interface generates the trust circle adding signal, the processing unit generates a first invitation code, displays the first invitation code through the display interface, and transmits the first invitation code to the data backup device through the communication interface.

Moreover, the data protection method for protecting the data stored in the data backup device is executed by the mobile device, and comprises steps of: determining whether a backup memory unit of the data backup device is locked; when the backup memory unit is locked, unlocking the backup memory unit, transmitting a user ID data of the mobile device to the data backup device, and determining whether a certified signal is received from the data backup device; when the certified signal is received, executing a file manager for loading the data stored in the backup memory unit, and determining whether a trust circle adding signal is generated; when the trust circle adding signal is generated, generating and displaying a first invitation code, and transmitting the first invitation code to the data backup device.

The processing unit of the mobile device of the present invention can transmit the user ID data to the data backup device for determining whether the mobile device having the user ID data is included in the trust circle. When the mobile device having the user ID data is included in the trust circle, the data backup device will allow the mobile device to load the data stored in the backup memory unit of the data backup device. Otherwise, the mobile device is forbidden loading the data stored in the backup memory unit. Namely, only the mobile device having the user ID data included in the trust circle of the data backup device can access the backup memory unit of the data backup device. Therefore, privacy of the data stored in the backup memory unit can be secured.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
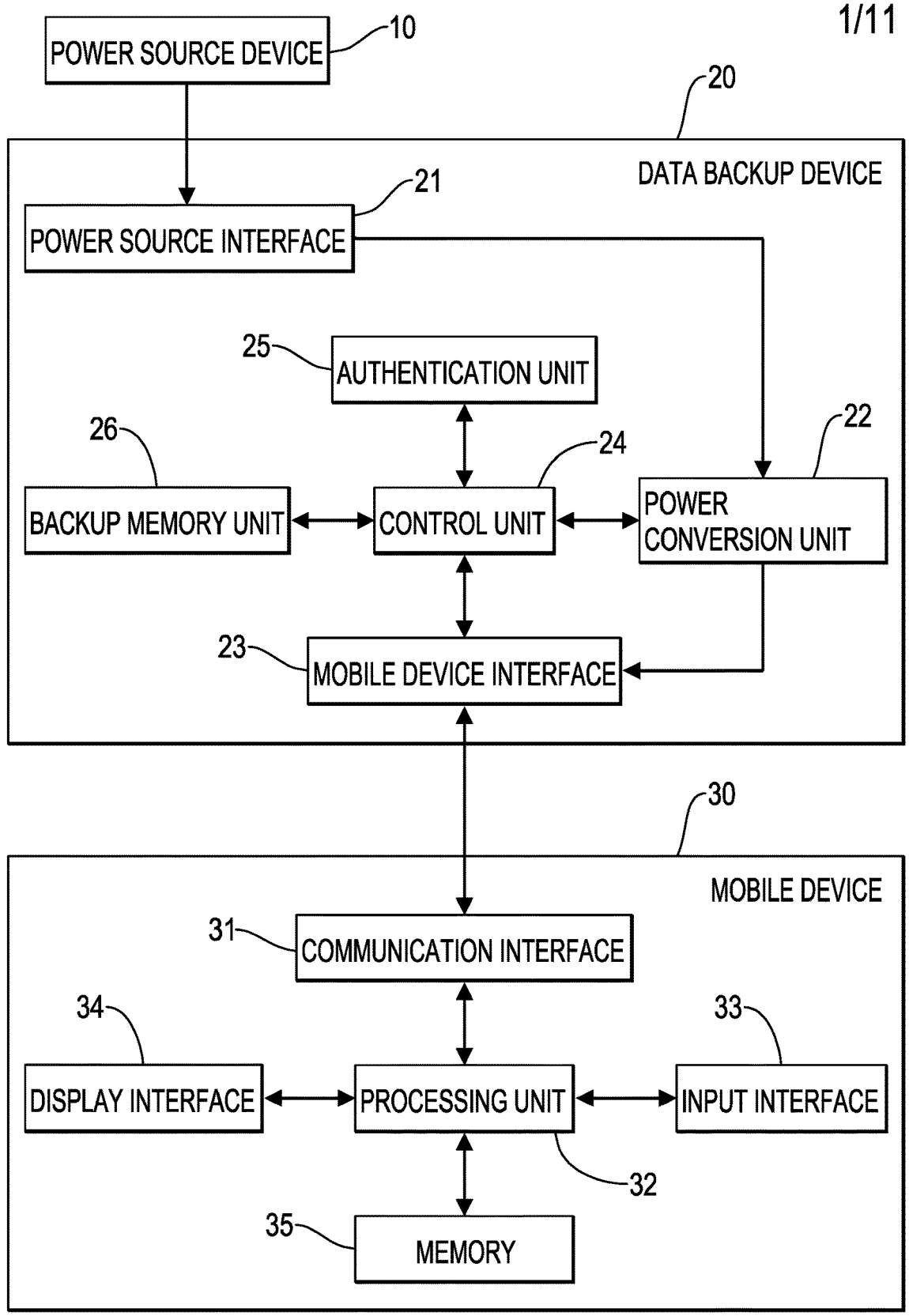
FIG. 1 is a block diagram of a power source device, a data backup device, and a mobile device of the present invention.

FIG. 1 is a block diagram of a power source device 10, a data backup device 20, and a mobile device 30 of the present invention. The power source device 10 provides electric power; for example, the power source device may be an adapter of the mobile device 30.

The data backup device 20 includes a power source interface 21, a power conversion unit 22, a mobile device interface 23, a control unit 24, an authentication unit 25, and a backup memory unit 26.

The power source interface 21 is adapted to electrically connect to the power source device 10. The power source interface 21 can be compatible with connection interfaces such as Universal Serial Bus (USB) TYPE A, USB TYPE C, or Lightning, etc.

The power conversion unit 22 electrically connects the power source interface 21 and the mobile device interface 23. The power conversion unit 22 receives the electric power from the power source device 10 through the power source interface 21, and converts the electric power to device power for charging the mobile device 30.

The mobile device interface 23 is used to electrically connect the mobile device 30 through a cable. The mobile device interface 23 can be compatible with USB TYPE A, USB TYPE C, or Lightning, etc. The cable can be a mobile device cable for charging and data transmission, such as a USB_A to Lightning cable, a Lightning to USB_C cable, a USB_A cable, a USB_C cable, a Lightning cable, or a USB_A to USB_C cable, etc.

The control unit 24 electrically connects to the power conversion unit 22, the mobile device interface 23, the authentication unit 25, and the backup memory unit 26. When the data backup device 20 electrically connects to the mobile device 30, the mobile device 30 firstly authenticates the data backup device 20 by using the authentication unit 25. If the data backup device 20 does not have the authentication unit 25 or the authentication unit 25 is not legitimate, the mobile device 30 cannot receive the device power from the data backup device 20, and the mobile device 30 cannot communicate with other electronical devices through the data backup device 20.

For example, the authentication unit 25 may be an MFi (Made For iPhone/iPod/iPad) chip, so that an Apple® mobile device can authenticate the data backup device 20 as a qualified device through the MFi chip when the data backup device 20 is connected to the Apple® mobile device.

The control unit 24 communicates with the mobile device 30 via the mobile device interface 23, so that the mobile device 3 can back up device data stored in a memory 35 of the mobile device 30 into the backup memory unit 26 of the data backup device 20 while charging the mobile device 30. The control unit 24 may be a microcontroller, a central processing unit (CPU), a programmable logic array (FPGA) or an application-specific integrated circuit (ASIC). The backup memory unit 26 can be static memory (SRAM), dynamic memory (DRAM), magnetic memory (MRAM), flash memory (FLASH memory), etc., or a combination thereof. Moreover, the backup memory unit 26 can also be an external memory device, such as a hard disk drive (HDD), a solid state drive (SSD), an SD memory card, a USB flash drive, and so on.

Namely, the data backup device 20 can back up the device data stored in the memory 35 of the mobile device 30 to the backup memory unit 26 of the data backup device 20 while charging the mobile device 30.

Further, since the data stored in the backup memory unit 26 of the data backup device 20 is backed up from the mobile device 30, the data stored in the backup memory unit 26 is usually private, such as personal photos or videos. Therefore, the data backup device 20 needs to secure the data stored in the backup memory unit 26.

Figure 2A:
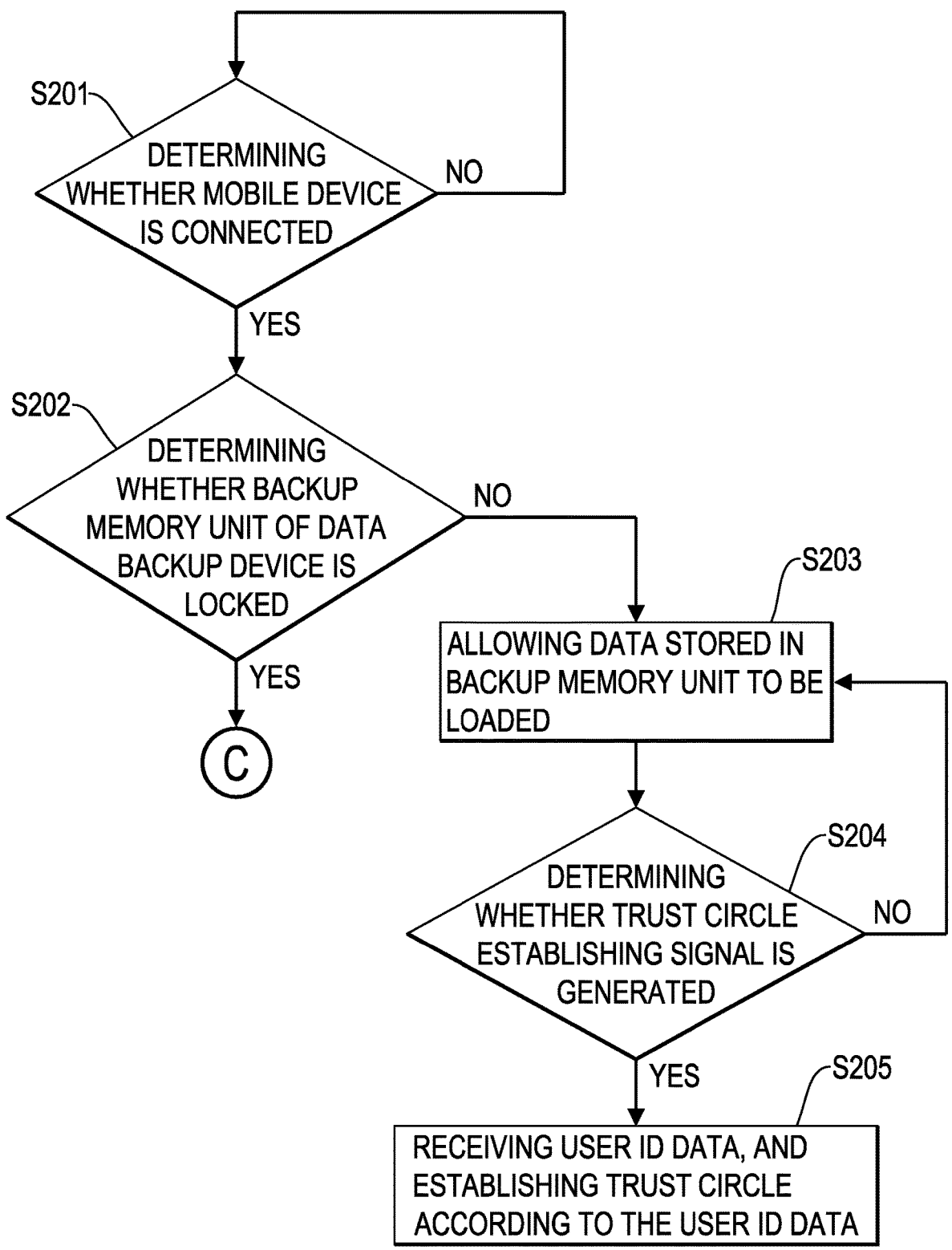
FIGS. 2A and 2B are flowcharts of steps executed by the data backup device.
Figure 2B:
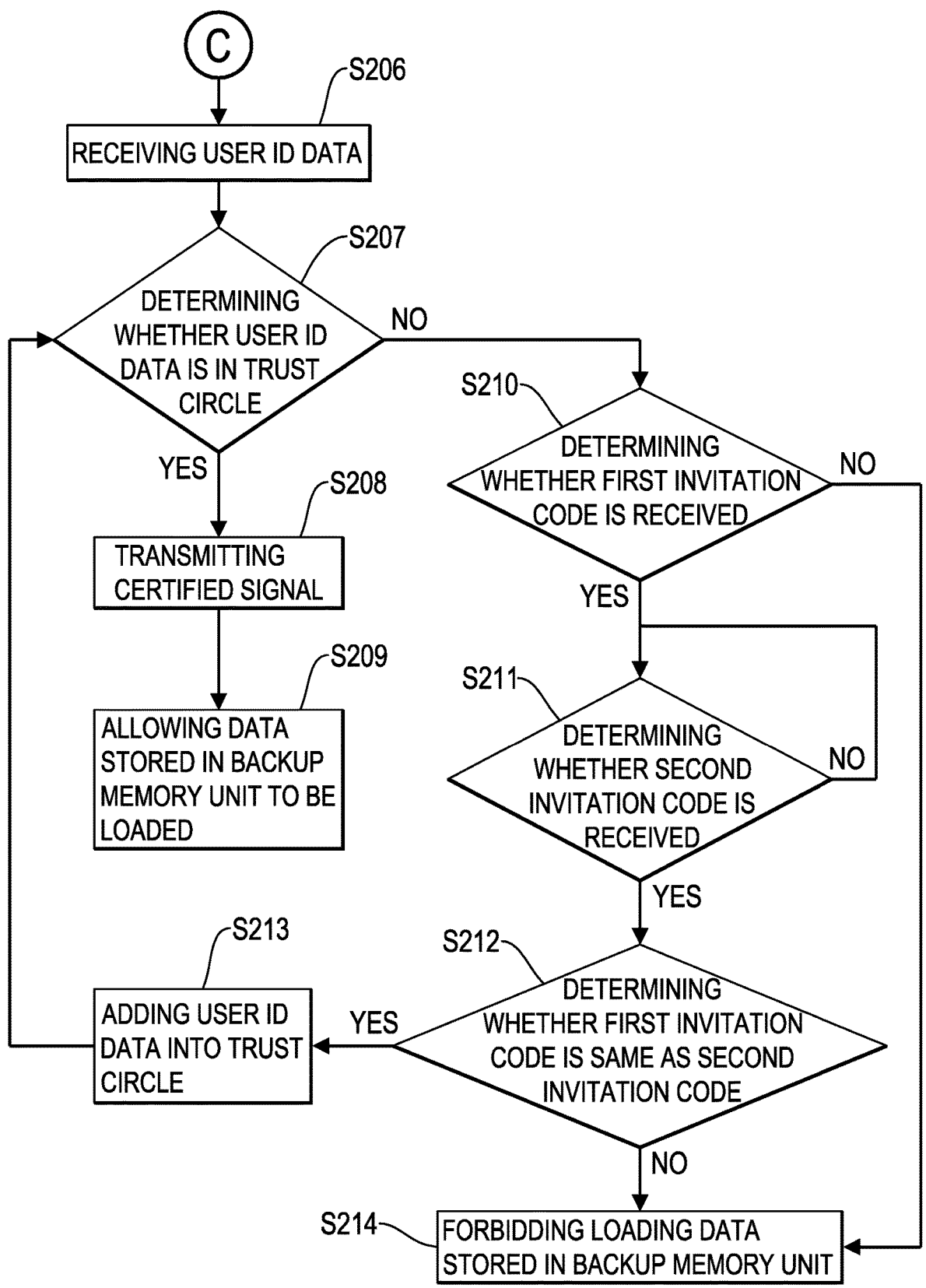

FIGS. 2A and 2B show flowcharts of steps executed by the control unit 24 of the data backup device 20. In step S201, the control unit 24 determines whether the mobile device 30 is connected. In step S202, when the mobile device 30 is connected, the control unit 24 determines whether the backup memory unit 26 is locked. In step S203, when the backup memory unit 26 is unlocked, the control unit 24 allows the data stored in the backup memory unit 26 to be loaded by the mobile device 30. In steps S204, the control unit 24 further determines whether a trust circle establishing signal is generated. In step S205, when the trust circle establishing signal is generated, the control unit 24 receives user ID data from the mobile device 30, and establishes a trust circle according to the user ID data. But when the trust circle establishing signal is not generated, the control unit 24 executes the step S203 again.

In step S206, when the backup memory unit 26 is locked, the control unit 24 receives the user ID data from the mobile device 30. In step S207, the control unit 24 further determines whether the user ID data is in the trust circle. In step S208, when the user ID data is in the trust circle, the control unit 24 transmits the certified signal. In step S209, the control unit 24 allows the data stored in the backup memory unit 26 to be loaded by the mobile device 30.

Figure 3:
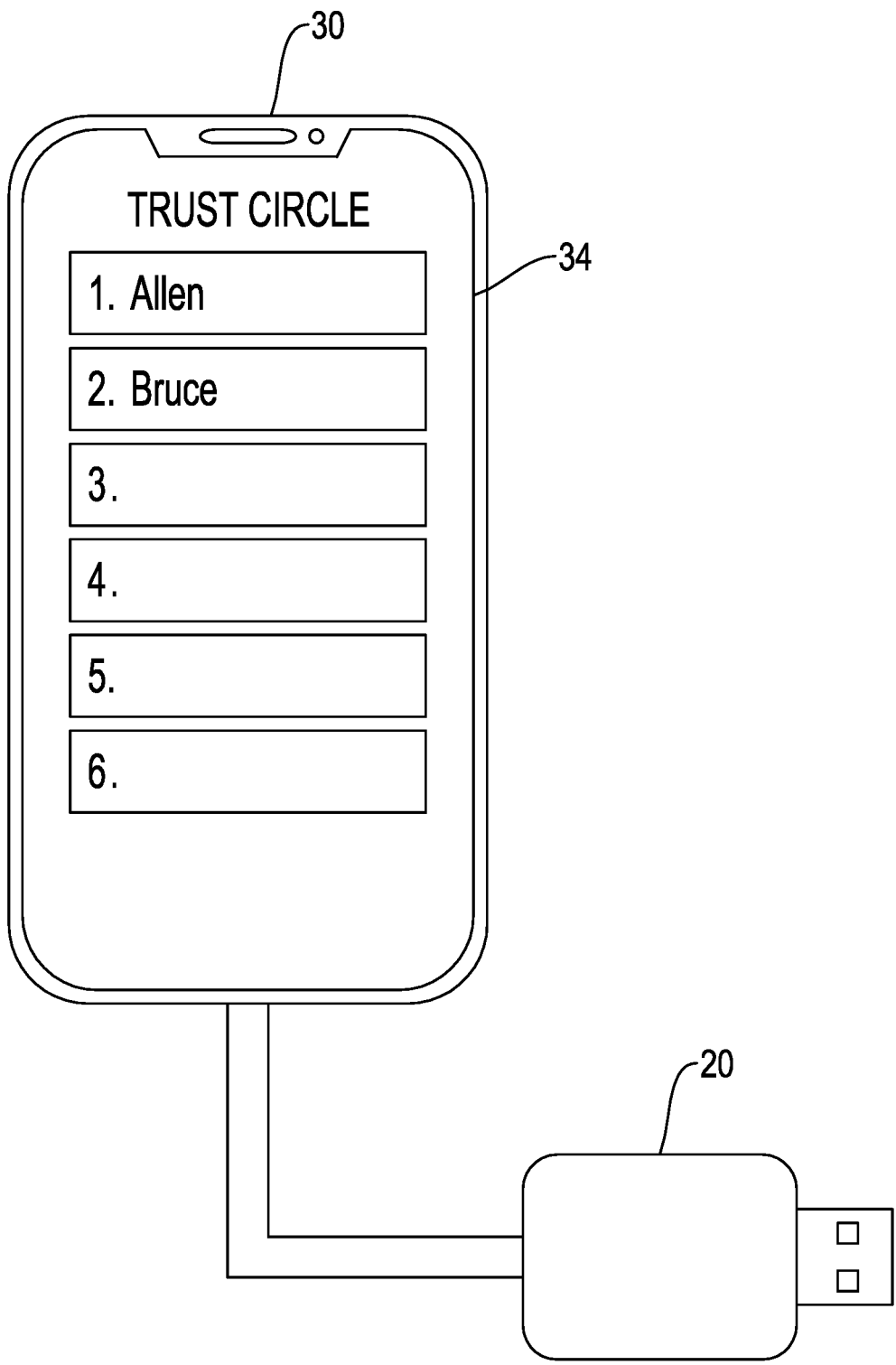
FIG. 3 is a schematic diagram of a trust circle displayed by a display interface of the mobile device.

For example, with reference to FIG. 3, the trust circle is an ID list stored in the data backup device 20, and the trust circle can be displayed on a display interface 34 of the mobile device 30. If the user ID data is listed on the ID list, the user ID data is in the trust circle, and vice versa. For example, the ID list includes the user ID data, such as Allen and Bruce, but does not include the user ID data, such as Carol and Diana. Namely, Allen and Bruce are included in the trust circle, but Carol and Diana are not.

In step S210, when the user ID data is not in the trust circle, the control unit determines whether a first invitation code is received. In step S211, when the first invitation code is received from the mobile device 30, the control unit 24 determines whether a second invitation code is received. In step S212, when the second invitation code is received from the mobile device 30, the control unit 24 determines whether the first invitation code is same as the second invitation code. In step S213, when the first invitation code is same as the second invitation code, the control unit 24 adds the user ID data received from the mobile device 30, transmitting the second invitation code into the trust circle of the data backup device 20. In step S214, when the first invitation code is different from the second invitation code, the control unit 24 forbids the mobile device 30 loading the data stored in the backup memory unit 26.

Figure 4A:
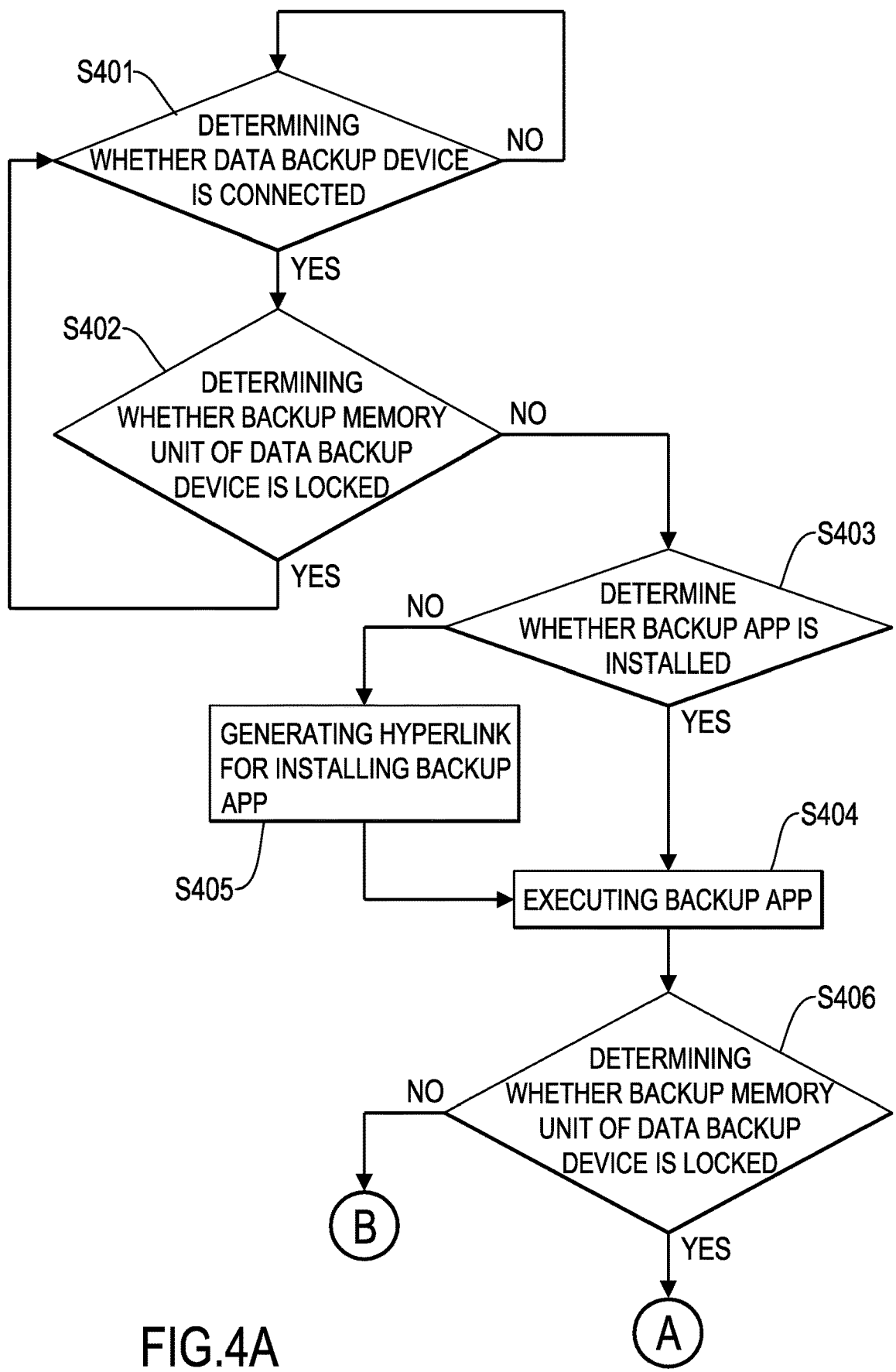
FIGS. 4A, 4B, and 4C are flowcharts for a data protection method of the present invention.
Figure 4B:
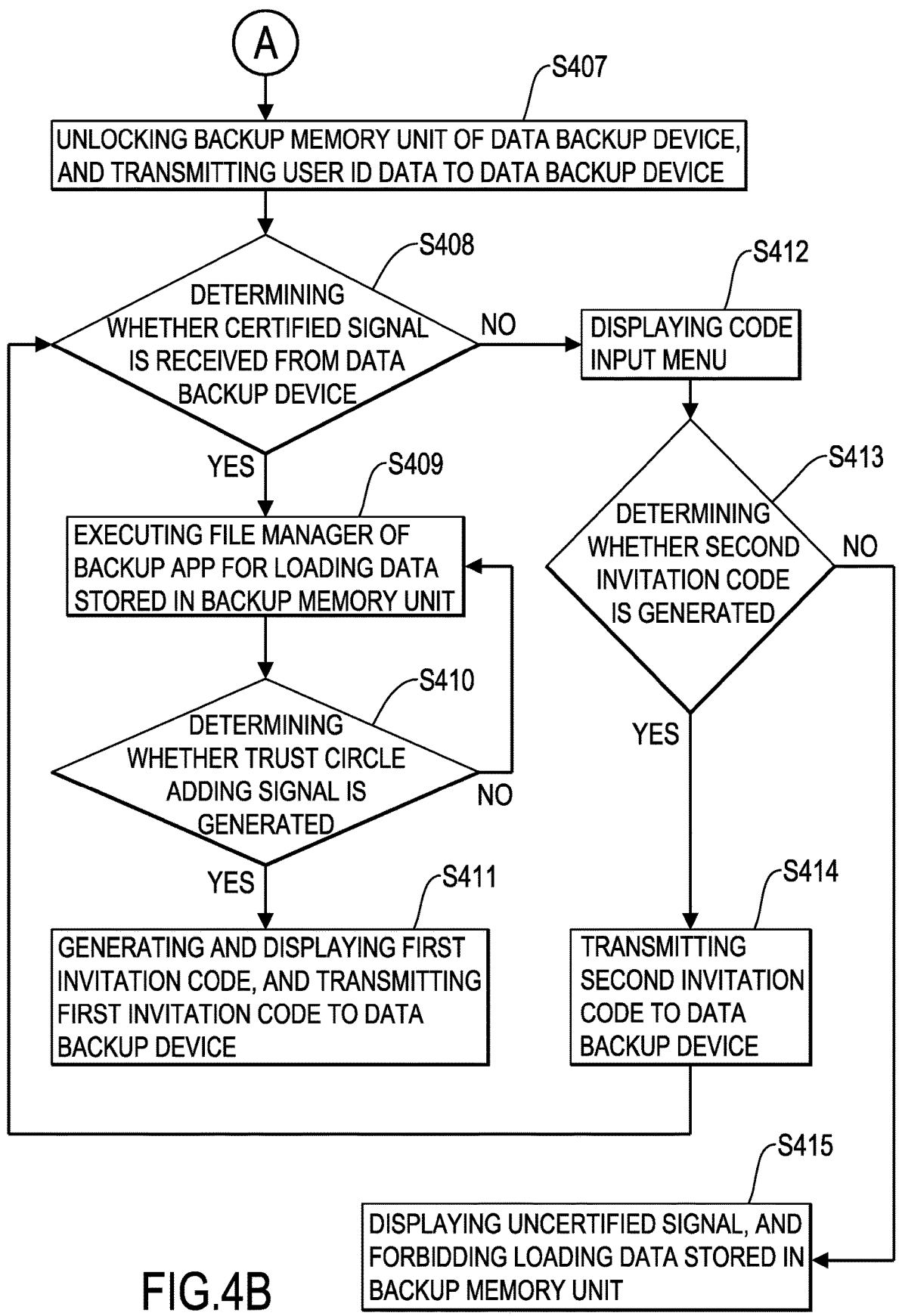
Figure 4C:
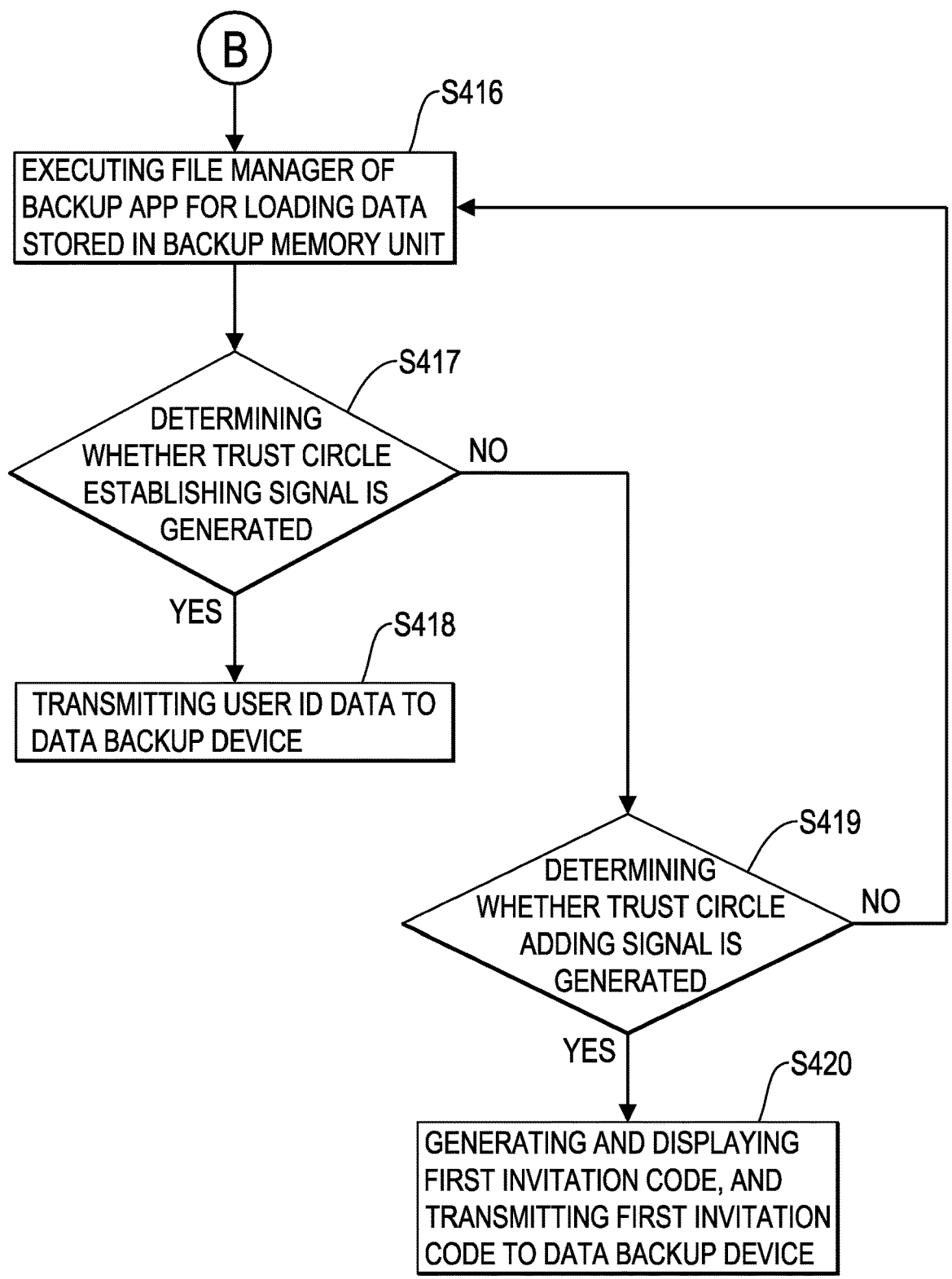

With reference to FIGS. 4A, 4B, and 4C, the mobile device 30 includes a communication interface 31, a processing unit 32, an input interface 33, the display interface 34, and the memory 35.

The communication interface 33 is adapted to connect to the data backup device 20 for receiving electric power from the data backup device 20, and for communicating with the data backup device 20.

The processing unit 32 is electrically connected to the communication interface 31, the input interface 33, the display interface 34, and the memory 35. The processing unit 32 executes a data protection method for protecting data stored in the data backup device 20, and includes the following steps.

In step S401, the processing unit 32 determines whether the data backup device 20 is connected. In step S402, when the data backup device 20 is connected, the processing unit 32 determines whether the backup memory unit 26 is locked through the communication interface 31. In step S403, when the backup memory unit 26 is not locked, the processing unit 32 determines whether a backup application (APP) is installed. In step S404, when the backup APP is installed, the processing unit 32 executes the backup APP, and then executes step S406. In step S405, when the backup APP is not installed, the processing unit 32 generates a hyperlink for installing the backup APP, and then executes step S404. In step S406, the processing unit 32 determines whether the backup memory unit 26 of the data backup device 20 is locked.

Figure 5:
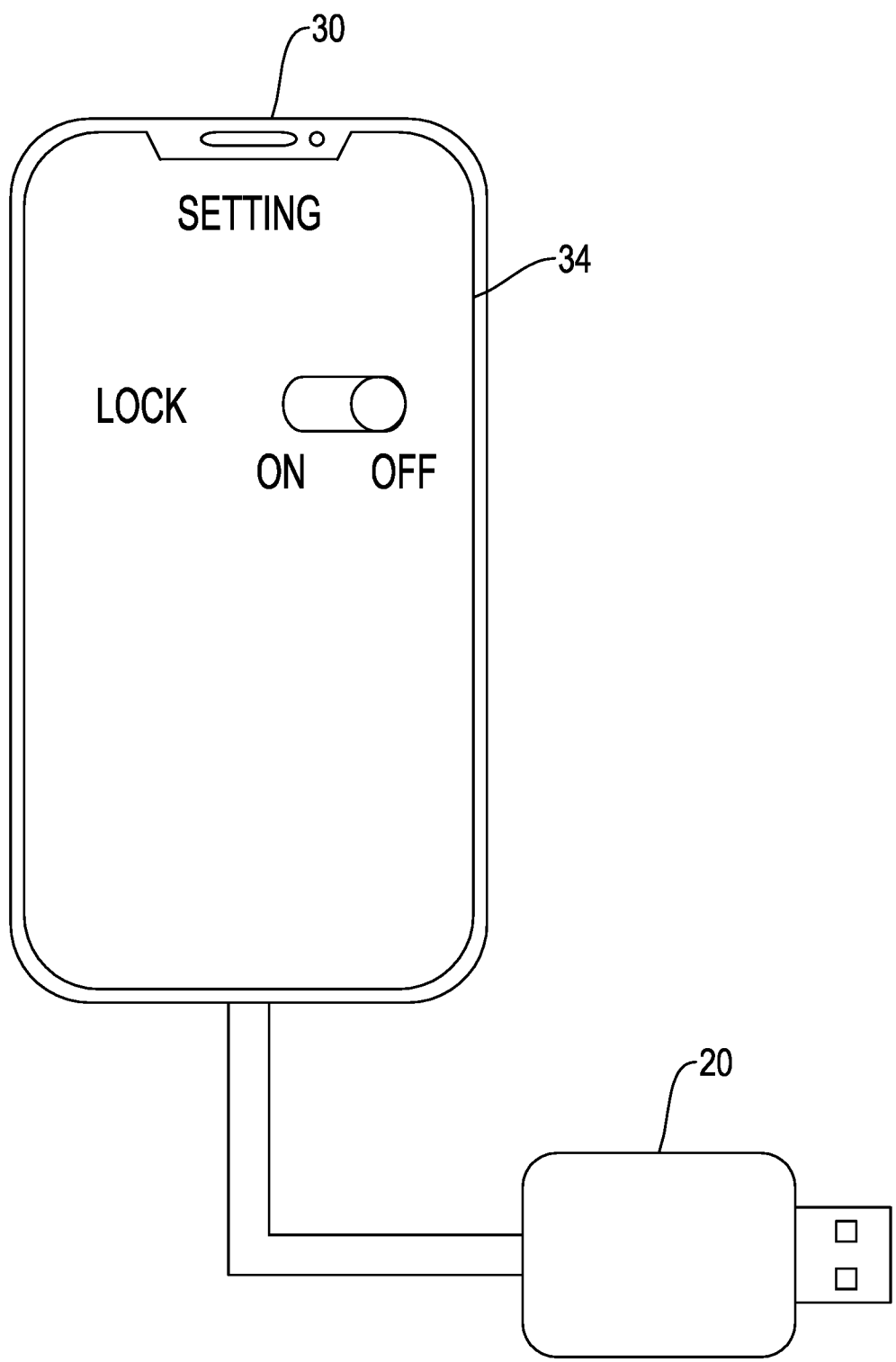
FIG. 5 is a schematic diagram for getting a first invitation code displayed by a display interface of the mobile device.

Further with reference to FIG. 5, executing the APP, the processing unit 32 can determine a lock state of the data backup device 20, and can change the lock state of the data backup device 20. For example, the processing unit 32 can access a setting menu of the APP, and the lock state of the data backup device 20 will be displayed on the display interface 34 of the mobile device 30. Then, a user of the mobile device 30 can switch on the lock state of the data backup device 20 to lock the backup memory unit 26 of the data backup device 20, or the user can switch off the lock state of the data backup device 20 to unlock the backup memory unit 26 of the data backup device 20.

In step S407, when the backup memory unit 26 of the data backup device 20 is locked, the processing unit 32 unlocks the backup memory unit 26, transmits the user ID data of the mobile device 30 to the data backup device 20, and executes step S408. In step S408, the processing unit 32 determines whether a certified signal is received from the data backup device 20 through the communication interface 31. In step S409, when the certified signal is received, the processing unit 32 executes a file manager of the backup APP for loading data stored in the backup memory unit 26, and executes step S410. In step S410, the processing unit 32 determines whether the input interface 33 generates a trust circle adding signal. In step S411, when the input interface 33 generates the trust circle adding signal, the processing unit 32 generates the first invitation code, displays the first invitation code through the display interface 34, and transmits the first invitation code to the data backup device 20 through the communication interface 31.

Figure 6A:
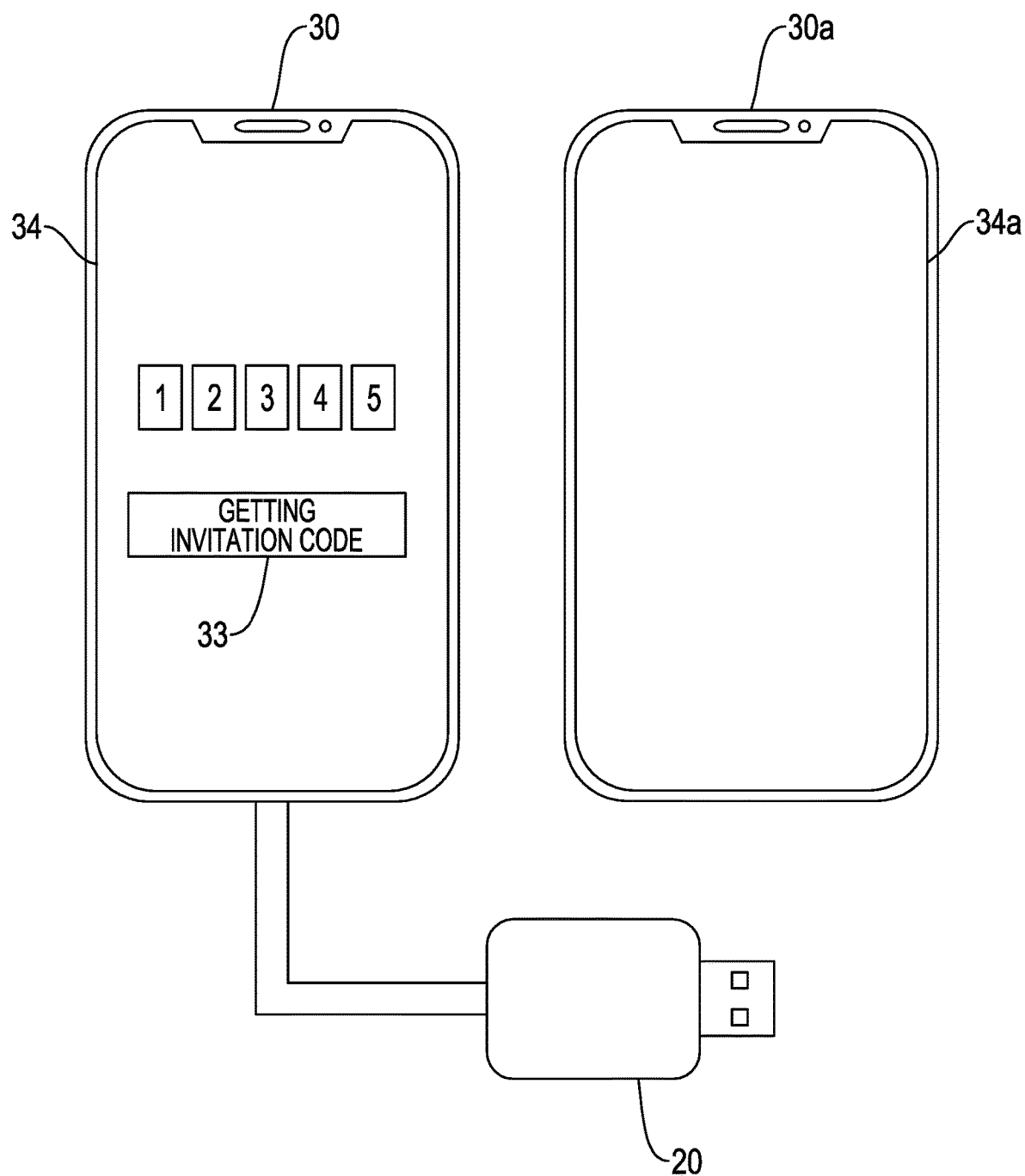
FIGS. 6A, 6B, and 6C are schematic diagrams of a first invitation code and a second invitation code by the display interfaces of the mobile devices.

For example, with reference to FIG. 6A, when the user presses a button displayed on the input interface 33, such as "GETTING INVITATION CODE", the processing unit 32 will generate the first invitation code, such as "12345". In the meantime, the mobile device 30 should connect to the data backup device 20. Therefore, the processing unit 32 can further transmit the first invitation code to the data backup device 20.

In step S412, when the certified signal is not received, the processing unit 32 displays a code input menu through the display interface 34, and executes step S413. In step S413, the processing unit 32 determines whether the input interface 34 generates a second invitation code.

In step S414, when the second invitation code is generated, the processing unit 32 transmits the second invitation code to the data backup device 20 through the communication interface 31. In step S415, when the second invitation code is not generated, the processing unit 32 displays an uncertified signal through the display interface 34, and forbids loading the data stored in the backup memory unit 26.

Figure 6B:
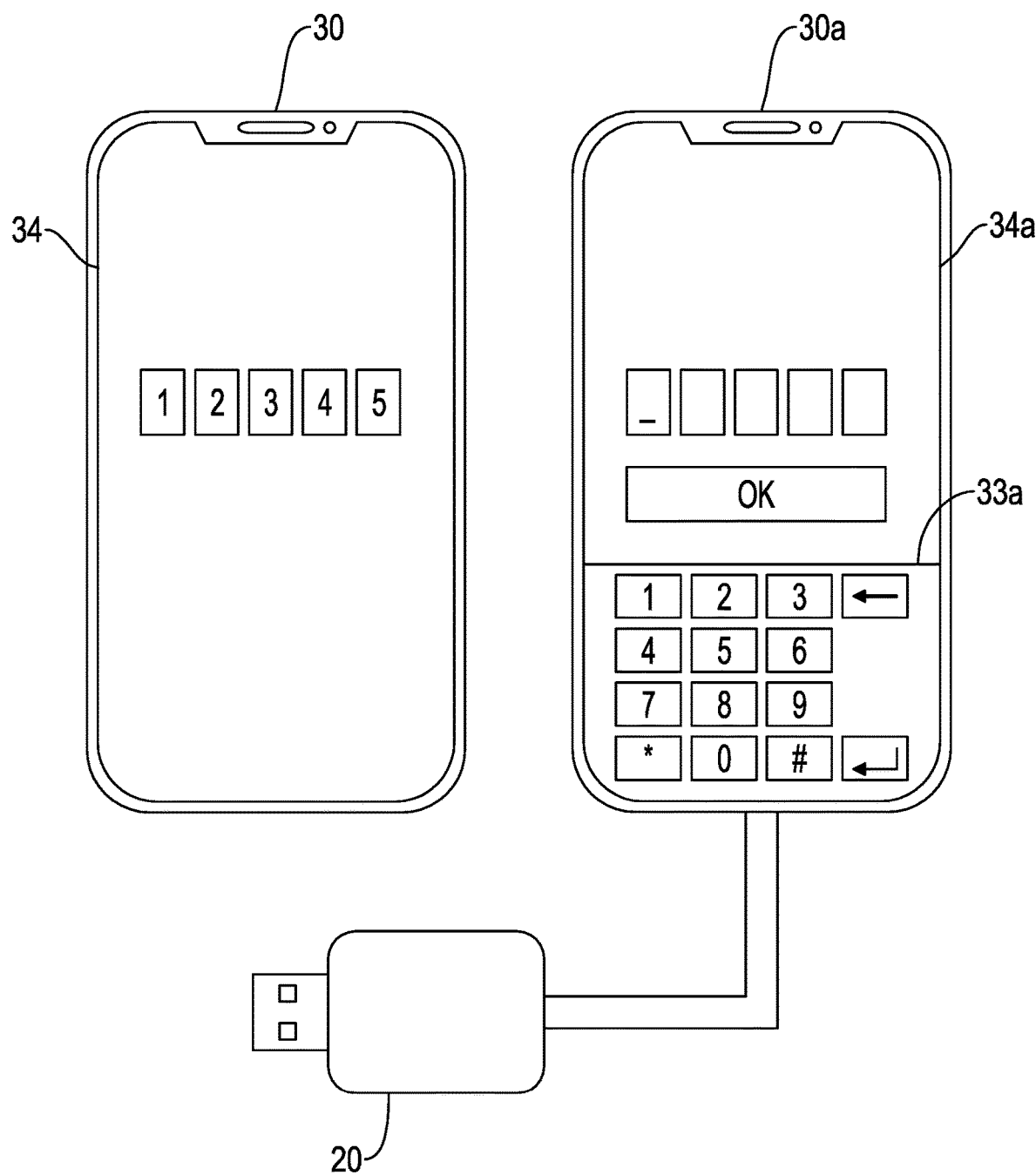
Figure 6C:
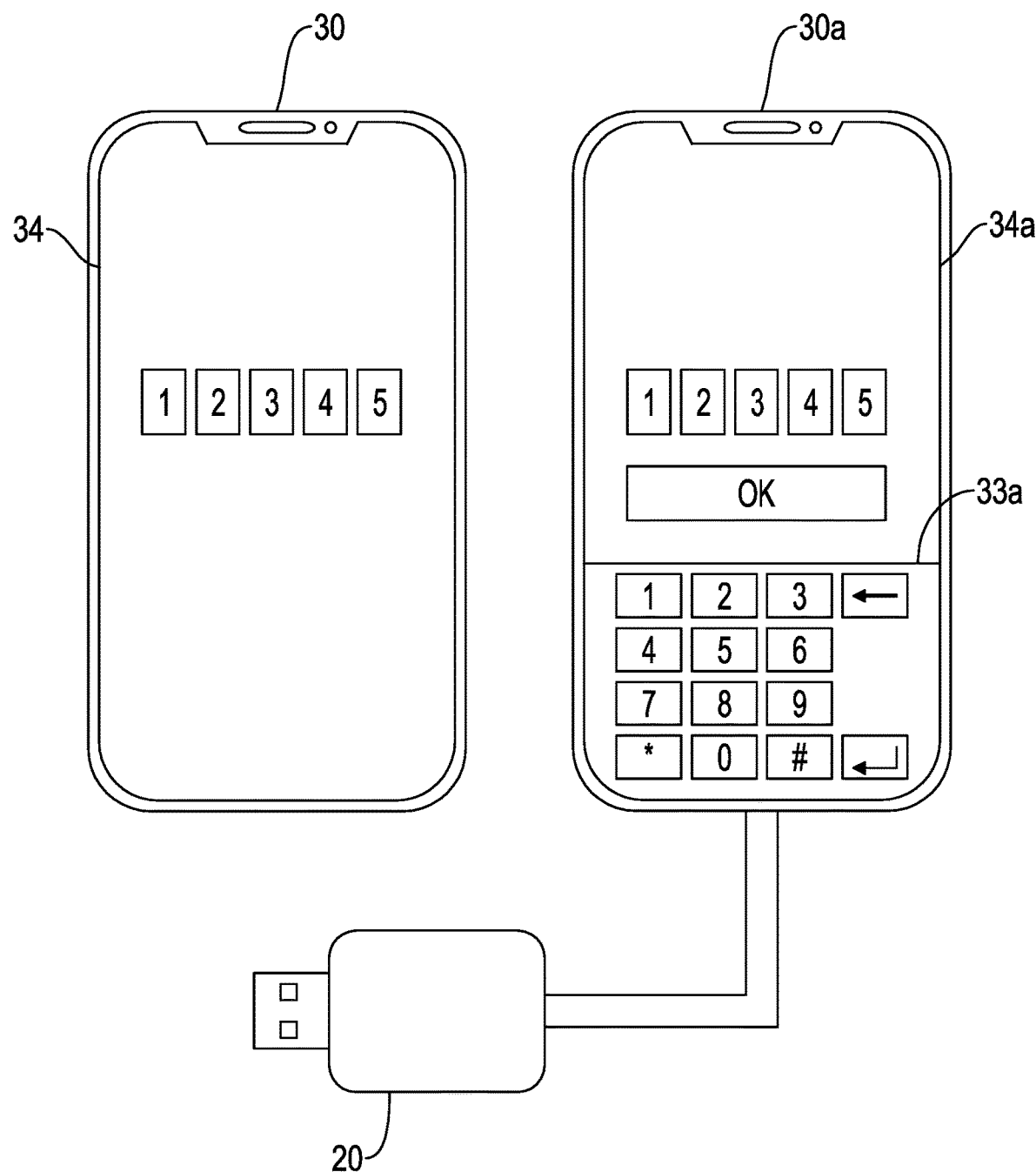

For example, with reference to FIGS. 6B and 6C, after the processing unit 32 transmits the first invitation code to the data backup device 20, the user will disconnect the data backup device 20 from the mobile device 30, and connect the data backup device 20 to another mobile device 30a. Then, the user can input the first invitation code, such as "12345", through the input interface 33a for generating the second invitation code. Therefore, the data backup device 20 can certify the second invitation code for determining whether said another mobile device 30a can be added into the trust circle. Namely, when the first invitation code is same as the second invitation code, the data backup device 20 will add said another mobile device 30a into the trust circle. But, when the first invitation code is different from the second invitation code, the data backup device 20 will not add said another mobile device 30a into the trust circle.

Moreover, in step S416, when the backup memory unit 20 is not locked, the processing unit 32 executes the file manager of the backup APP for loading the data stored in the backup memory unit 26, and executes step S417. In step S417, the processing unit 32 determines whether a trust circle establishing signal is generated. In step 418, when the trust circle establishing signal is generated, the processing unit 32 transmits the user ID data to the data backup device 20. In step S419, when the trust circle establishing signal is not generated, the processing unit 32 determines whether the trust circle adding signal is generated. In step S420, when the trust circle adding signal is generated, the processing unit 32 generates the first invitation code, displays the first invitation code through the display interface 34, and transmits the first invitation code to the data backup device 20.

From the above steps of the data protection method for protecting data stored in the data backup device 20 executed by the mobile device 30 of the present invention, it can be seen that the mobile device 30 needs to execute the backup App for accessing the backup memory unit 26 of the data backup device 20. Further, only when the user ID data of the mobile device 30 is included in the trust circle of data backup device 20, the mobile device 30 can access the backup memory unit 26 of the data backup device 20. Therefore, the privacy of the data stored in the backup memory unit 26 can be secured.

The aforementioned are preferred embodiments of the present invention. It should be noted that for those of ordinary skill in the art, without departing from the principles of the present invention, certain improvements and retouches of the present invention can still be made which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A mobile device for protecting data stored in a data backup device, comprising:
   a communication interface, adapted to connect to the data backup device for receiving electric power from the data backup device and communicating with the data backup device;
   an input interface;
   a display interface;
   a processing unit, electrically connected to the communication interface, the input interface, and the display interface, and determining whether a backup memory unit of the data backup device is locked;
   wherein when the backup memory unit is locked, the processing unit unlocks the backup memory unit, transmits a user ID data of the mobile device to the data backup device, and determines whether a certified signal is received from the data backup device through the communication interface;

wherein when the certified signal is received, the processing unit executes a file manager for loading the data stored in the backup memory unit, and determines whether the input interface generates a trust circle adding signal;
wherein when the input interface generates the trust circle adding signal, the processing unit generates a first invitation code, displays the first invitation code through the display interface, and transmits the first invitation code to the data backup device through the communication interface;
wherein the first invitation code is used for adding another mobile device into a trust circle.

2. The mobile device as claimed in claim 1, wherein when the processing unit determines that the certified signal is not received, the processing unit displays a code input menu through the display interface, and determines whether the input interface generates a second invitation code;
wherein when the processing unit determines that the second invitation code is generated, the processing unit transmits the second invitation code to the data backup device through the communication interface;
wherein when the processing unit determines that the second invitation code is not generated, the processing unit displays an uncertified signal through the display interface, and forbids loading the data stored in the backup memory unit.

3. The mobile device as claimed in claim 1, wherein before the processing unit determines whether the backup memory unit of the data backup device is locked, the processing unit further determines whether a backup application (APP) is installed;
wherein when the backup APP is installed, the processing unit executes the backup APP, and then determines whether the backup memory unit of the data backup device is locked;
wherein when the backup APP is not installed, the processing unit generates a hyperlink for installing the backup APP, installs the backup APP, executes the backup APP, and then determines whether the backup memory unit of the data backup device is locked.

4. The mobile device as claimed in claim 3, wherein before the processing unit determines whether the backup APP is installed, the processing unit further determines whether the data backup device is connected;
wherein when the data backup device is connected, the processing unit determines whether the backup memory unit is locked through the communication interface;
wherein when the backup memory unit is not locked, the processing unit determines whether the backup APP is installed.

5. The mobile device as claimed in claim 1, wherein when the backup memory unit is not locked, the processing unit executes a file manager of a backup APP for loading the data stored in the backup memory unit, and determines whether a trust circle establishing signal is generated;
wherein when the trust circle establishing signal is generated, the processing unit transmits the user ID data to the data backup device;
wherein when the trust circle establishing signal is not generated, the processing unit determines whether the trust circle adding signal is generated;
wherein when the trust circle adding signal is generated, the processing unit generates the first invitation code, displays the first invitation code through the display interface, and transmits the first invitation code to the data backup device.

6. A data protection method for protecting data stored in a data backup device, executed by a mobile device, and comprising steps of:
(a) determining whether a backup memory unit of the data backup device is locked;
(b) when the backup memory unit is locked, unlocking the backup memory unit, transmitting a user ID data of the mobile device to the data backup device, and determining whether a certified signal is received from the data backup device;
(c1) when the certified signal is received, executing a file manager for loading the data stored in the backup memory unit, and determining whether a trust circle adding signal is generated;
(c11) when the trust circle adding signal is generated, generating and displaying a first invitation code, and transmitting the first invitation code to the data backup device;
wherein the first invitation code is used for adding another mobile device into a trust circle.

7. The data protection method as claimed in claim 6, further comprising steps of:
(c2) when the certified signal is not received, displaying a code input menu, and determining whether a second invitation code is generated;
(c21) when the second invitation code is generated, transmitting the second invitation code to the data backup device;
(c22) when the second invitation code is not generated, displaying an uncertified signal, and forbidding loading the data stored in the backup memory unit.

8. The data protection method as claimed in claim 6, wherein before executing the step (a), the data protection method further comprises steps of:
(a1) determining whether a backup application (APP) is installed;
(a2) when the backup APP is installed, executing the backup APP, and executing the step (a);
(a3) when the backup APP is not installed, generating a hyperlink for installing the backup APP, installing the backup APP, executing the backup APP, and executing the step (a).

9. The data protection method as claimed in claim 8, wherein before executing the step (a1), the data protection method further comprises steps of:
(a11) determining whether the data backup device is connected;
(a12) when the data backup device is connected, determining whether the backup memory unit is locked;
(a13) when the backup memory unit is not locked, executing the step (a1).

10. The data protection method as claimed in claim 6, wherein after executing step (a), when the backup memory unit is not locked, the data protection method further comprises steps of:
(a21) executing the file manager of the backup APP for loading the data stored in the backup memory unit, and determining whether a trust circle establishing signal is generated;
(a22) when the trust circle establishing signal is generated, transmitting the user ID data to the data backup device;

(a23) when the trust circle establishing signal is not generated, determining whether the trust circle adding signal is generated;

(a24) when the trust circle adding signal is generated, generating and displaying the first invitation code, and transmitting the first invitation code to the data backup device.

\* \* \* \* \*